(12) United States Patent
Jiang et al.

(10) Patent No.: US 10,509,801 B2
(45) Date of Patent: Dec. 17, 2019

(54) SELECTIVE DATA SYNCHRONIZATION AND TRANSFER TO REMOTE DISTRIBUTED DATABASE SERVERS

(71) Applicant: General Instrument Corporation, Horsham, PA (US)

(72) Inventors: Oscar L. Jiang, Rosemead, CA (US); Jason A. Pasion, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1192 days.

(21) Appl. No.: 14/165,824

(22) Filed: Jan. 28, 2014

(65) Prior Publication Data

US 2014/0214765 A1 Jul. 31, 2014

Related U.S. Application Data

(60) Provisional application No. 61/757,377, filed on Jan. 28, 2013.

(51) Int. Cl.
*G06F 16/27* (2019.01)

(52) U.S. Cl.
CPC .................... *G06F 16/27* (2019.01)

(58) Field of Classification Search
CPC .......................... G06F 17/30575; G06F 16/27
USPC ........................................................ 707/634
See application file for complete search history.

(56) References Cited

U.S. PATENT DOCUMENTS

| | | | |
|---|---|---|---|
| 8,224,935 B1 * | 7/2012 | Bandopadhyay | G06F 9/5072 370/256 |
| 2005/0278627 A1 * | 12/2005 | Malik | G06F 17/30893 715/255 |
| 2006/0010103 A1 * | 1/2006 | Malik | G06F 17/30194 |

(Continued)

FOREIGN PATENT DOCUMENTS

| | | |
|---|---|---|
| TW | 201042470 A1 | 12/2010 |
| TW | 201101066 A1 | 1/2011 |

OTHER PUBLICATIONS

Official Action, RE: Taiwan Application No. 103103276, dated Feb. 6, 2017.

*Primary Examiner* — Joshua Bullock
(74) *Attorney, Agent, or Firm* — Thomas A. Ward

(57) ABSTRACT

A method for resolving the synchronization of identity data from a central database server to distributed database servers is provided. The method involves synchronizing identity data to central and distributed database servers based on identity data types associated with a factory. The method first includes assigning by a configuration manager identity data types to factories which manufacture devices that will need identity data. Next an Identity Data (ID) Loader receives a file containing the identity data, and the ID Loader loads the identity data to a central database server and creates a file history record indicating a record of the file loaded. Next, a Factory Synchronizer Loader (FSL) is triggered to create and execute jobs to load identity data, configuration data or other data. Finally, the identity data is synchronized between the central data base with the remote database servers in a location of the factory. In some embodiments, the FSL corrects identity data and resynchronizes, or determines when synchronization fails and repeats synchronization processes when the failure occurs.

6 Claims, 13 Drawing Sheets

(56) References Cited

U.S. PATENT DOCUMENTS

| | | | |
|---|---|---|---|
| 2007/0180194 A1* | 8/2007 | Graham | G06F 11/1658 711/133 |
| 2007/0220590 A1* | 9/2007 | Rasmussen | H04L 63/08 726/4 |
| 2008/0133543 A1* | 6/2008 | Fu | G06F 17/30575 |
| 2010/0268784 A1* | 10/2010 | Henness | G06F 17/30575 709/206 |
| 2012/0089664 A1* | 4/2012 | Igelka | G06F 9/5083 709/203 |

* cited by examiner

ID Data Loading Tables

| Identity Data Name | Identity Data Type | Factory Name | Factory ID |
|---|---|---|---|
| Comcast XRE | 65537 | Foxconn - Tianjin | 1000 |
| Comcast XRE | 65537 | Cinram – Texas | 2000 |
| JCOM | 65538 | Foxconn – Tianjin | 1000 |
| JCOM | 65538 | Foxconn – Taiwan | 3000 |

Configuration Table

FIG. 1

| Identity Data ID | Identity Data Type | Device ID | Identity Data | File ID | Last Updated |
|---|---|---|---|---|---|
| 1 | 65537 | 0x000000000000 | <Comcast XRE PKI> | 1 | 1/1/2013 |
| .... | ... | ... | ... | ... | ... |
| 4096 | 65537 | 0x000000000FFF | <Comcast XRE PKI> | 1 | 1/1/2013 |
| 4097 | 65538 | 0x000000000000 | <JCOM PKI> | 2 | 2/1/2013 |
| ... | ... | ... | ... | ... | ... |
| 8192 | 65538 | 0x000000000FFF | <JCOM PKI> | 2 | 2/1/2013 |

Identity Data Table

FIG. 2

| File ID | File Name | File Size | File Hash | Last Updated |
|---------|-----------|-----------|-----------|--------------|
| 1 | Comcast_XRE_010113.bin | 80 MB | ... | 1/1/2013 |
| 2 | JCOM_020113.bin | 100 MB | ... | 2/1/2013 |

File History Table

FIG. 3

| Event ID | Event Type | Table | Record ID | Status | Last Updated |
|----------|------------|-------|-----------|--------|--------------|
| 1 | Identity Data Loaded | File History | 1 | COMPLETED | 1/1/2013 |
| 2 | Identity Data Loaded | File History | 2 | PENDING | 2/1/2013 |

Event Table

FIG. 4

| Job ID | Job Type  | Event ID | Status    | Last Updated |
|--------|-----------|----------|-----------|--------------|
| 1      | LOAD_DATA | 1        | COMPLETED | 1/1/2013     |
| 2      | LOAD_DATA | 1        | COMPLETED | 1/1/2013     |
| 3      | LOAD_DATA | 2        | PENDING   | 2/1/2013     |
| 4      | LOAD_DATA | 2        | PENDING   | 2/1/2013     |

Job Table

FIG. 5

| Job Details ID | Job ID | Table | Record ID | Factory ID | Status | Last Updated |
|---|---|---|---|---|---|---|
| ... | ... | ... | ... | ... | ... | ... |
| 8192 | 2 | Identity Data | 4096 | 2000 | COMPLETED | 1/1/2013 |
| 8193 | 3 | Identity Data | 4097 | 1000 | PENDING | 2/1/2013 |
| ... | ... | ... | ... | ... | ... | ... |
| 12289 | 4 | Identity Data | 4097 | 3000 | PENDING | 2/1/2013 |
| ... | ... | ... | ... | ... | ... | ... |
| 16384 | 4 | Identity Data | 8192 | 3000 | PENDING | 2/1/2013 |

Job Detail Table

FIG. 6

Configuration Data Synchronization Tables

| Identify Data Type ID | Identity Data Name | Address Type | Identity Size |
|---|---|---|---|
| 65537 | Comcast XRE | Unit Address | 5000 |
| 65538 | JCOM | MAC | 4000 |
| 65539 | Secure Media | Unit Address | 5200 |

Identity Data Type Table

FIG. 7

| Identify Data Name | Identity Data Type | Factory Name | Factory ID |
|---|---|---|---|
| Secure Media | 65539 | Foxconn Tianjin | 1000 |
| Secure Media | 65539 | Foxconn Taiwan | 3000 |

Configuration Table

FIG. 8

| Event ID | Event Type | Table | Record ID | Status | Last Updated |
|---|---|---|---|---|---|
| 5 | CONFIG_DATA _CHANGED | Identity Data Type | 65539 | Pending | 1/21/14 1:00:00 |

Event Table

FIG. 9

| Job ID | Job Type | Event ID | Status | Last Updated |
|---|---|---|---|---|
| 5 | SYNC_CONFIG_DATA | 5 | Pending | 1/21/14 6:00 |
| 6 | SYNC_CONFIG_DATA | 5 | Pending | 1/21/14 6:00 |

Job Table

FIG. 10

| Job Details ID | Job ID | Table | Record ID | Factory ID | Status | Last Updated |
|---|---|---|---|---|---|---|
| 16385 | 5 | Identity Data Type | 65539 | 1000 | Pending | 1/21/14 6:00 |
| 16386 | 6 | Identity Data Type | 65539 | 3000 | Pending | 1/21/14 6:00 |

Job Details Table

FIG. 11

Identity Data Change and Sync Tables

| Identity Data ID | Identity Data Type | Device ID | Identity Data | File ID | Last Updated | Status |
|---|---|---|---|---|---|---|
| 1 | 65537 | 0x000000000000 | <Comcast XRE PKI> | 1 | 1/1/2013 | Disable |
| 2 | 65537 | 0x000000000000 | <Comcast XRE PKI> | 1 | 1/1/2013 | Active |
| — | — | — | — | — | — | — |
| 8193 | 65537 | 0x000000000000 | <Comcast XRE PKI wfix> | 3 | 1/22/2014 | Active |

Identity Data Table

FIG. 12

| File ID | File Name | File Size | File Hash | Last Updated |
|---|---|---|---|---|
| 3 | COMCAST_XRE_Fix.bin | 5KB | — | 1/22/14 |

File History Table

FIG. 13

| File ID | File Name | File Size | File Hash | Status | Last Updated |
|---|---|---|---|---|---|
| 6 | ID_DATA_CHANGED | Identity Data | 8193 | Pending | 1/22/14 1:00:00 |

Event Table

FIG. 14

| Job ID | Job Type | Event ID | Status | Last Updated |
|---|---|---|---|---|
| 7 | SYNC_ID_DATA | 6 | Pending | 1/22/14 6:00 |
| 8 | SYNC_ID_DATA | 6 | Pending | 1/22/14 6:00 |

Job Table

FIG. 15

| Job Details ID | Job ID | Table | Record ID | Factory ID | Status | Last Updated |
|---|---|---|---|---|---|---|
| 16387 | 7 | Identity Data | 1 | 1000 | Pending | 1/22/14 6:00 |
| 16388 | 7 | Identity Data | 8193 | 1000 | Pending | 1/22/14 6:00 |
| 16389 | 8 | Identity Data | 1 | 2000 | Pending | 1/22/14 6:00 |
| 16390 | 8 | Identity Data | 8193 | 2000 | Pending | 1/22/14 6:00 |

Job Details Table

FIG. 16

New Remote Database Server Update

| Factory ID | Factory Name |
|---|---|
| 1000 | Foxconn Tianjin |
| 2000 | CinramTexas |
| 3000 | Foxconn Taiwan |
| 4000 | Flextronics Taiwan |

Factory Table

FIG. 17

| Identify Data Name | Identity Data Type | | Factory ID |
|---|---|---|---|
| Comcast XRE | 65537 | Flextronics Tiawan | 4000 |

Configuration Table

FIG. 18

| Event ID | Event Type | Table | Record ID | Status | Last Updated |
|---|---|---|---|---|---|
| 7 | NEW_FACTORY | Factory | 4000 | Pending | 1/22/14 1:00:00 |

Event Table

FIG. 19

| Job ID | Job Type | Event ID | Status | Last Updated |
|---|---|---|---|---|
| 9 | LOAD_DATA | 7 | Pending | 1/22/14 6:00 |

Job Table

FIG. 20

| Job Details ID | Job ID | Table | Record ID | Factory ID | Status | Last Updated |
|---|---|---|---|---|---|---|
| 16391 | 9 | Identity Data | 8193 | 4000 | Pending | 1/23/14 6:00 |
| 16392 | 9 | Identity Data | 1 | 4000 | Pending | 1/23/14 6:00 |
| — | — | — | — | — | — | — |
| 20488 | 9 | Identity Data | 4096 | 4000 | Pending | 1/23/14 6:00 |

Job Details Table

FIG. 21

Tables Showing Completion or Failure of Synchronization

| Job ID | Job Type | Event ID | Status | Last Updated |
|---|---|---|---|---|
| 5 | SYNC_CONFIG_DATA | 5 | COMPLETED | 1/21/14 6:00 |
| 6 | SYNC_CONFIG_DATA | 5 | COMPLETED | 1/21/14 6:00 |
| 7 | SYNC_ID_DATA | 6 | COMPLETED | 1/22/14 6:00 |
| 8 | SYNC_ID_DATA | 6 | COMPLETED | 1/22/14 6:00 |
| 9 | LOAD_Data | 7 | FAILED | 1/21/14 6:00 |

Job Table

FIG. 22

| Job Details ID | Job ID | Table | Record ID | Factory ID | Status | Last Updated |
|---|---|---|---|---|---|---|
| 16385 | 5 | Identity Data Type | 65539 | 1000 | Completed | 1/21/14 6:00 |
| 16386 | 6 | Identity Data Type | 65539 | 3000 | Completed | 1/21/14 6:00 |
| 16387 | 7 | Identity Data | 1 | 1000 | Completed | 1/22/14 6:00 |
| 16388 | 7 | Identity Data | 8193 | 1000 | Completed | 1/22/14 6:00 |
| 16389 | 8 | Identity Data | 1 | 2000 | Completed | 1/22/14 6:00 |
| 16390 | 8 | Identity Data | 8193 | 2000 | Completed | 1/22/14 6:00 |
| 16391 | 9 | Identity Data | 8193 | 4000 | Completed | 1/22/14 6:00 |
| 16392 | 9 | Identity Data | 1 | 4000 | Completed | 1/22/14 6:00 |
| — | — | — | — | — | — | — |
| 20000 | 9 | Identity Data | 3608 | 4000 | Failed | 1/22/14 7:00 |
| — | — | — | — | — | — | — |
| 20488 | 9 | Identity Data | 4096 | 4000 | Failed | 1/22/14 7:00 |

Job Details Table

FIG. 23

Multiple FSL Case

| Job ID | Job Type | Event ID | Status | Last Updated |
|---|---|---|---|---|
| 10 | LOAD_DATA | 8 | COMPLETED | 1/24/14 6:00 |
| 11 | LOAD_DATA | 8 | IN PROCESS | 1/24/14 6:00 |
| 12 | LOAD_DATA | 9 | PENDING | 1/24/14 6:00 |
| 13 | LOAD_DATA | 9 | PENDING | 1/24/14 6:00 |

Job Table

SELECTIVE DATA SYNCHRONIZATION AND TRANSFER TO REMOTE DISTRIBUTED DATABASE SERVERS

CLAIM OF PRIORITY

This Application claims priority under 35 U.S.C. § 119(e) from an earlier filed U.S. Provisional Application Ser. No. 61/757,377, filed Jan. 28, 2013, which is hereby incorporated by reference.

BACKGROUND

Technical Field

The present invention relates to providing identity data from a central database server to remote distributed database servers. More particularly, the present invention relates to synchronization of the distributed identity data between the central server and all the remote servers.

Related Art

In previous systems, identity data is loaded to all remote distributed database servers so each server has the same identity data. There is no prior knowledge on which database server gets which identity data, so it is important that the identity data loaded to central database server is in synch with each distributed database server.

Synchronizing identity data across all remote distributed database servers with the central database server, however, is difficult for the following reasons:

1. Data replication over a Wireless Area Network (WAN) is not viable especially for a large amount of data.

2. The network reliability and performance to some remote database servers are not stable.

3. The central database server is located behind a firewall which does not allow remote connections from the distributed database servers due to strict security requirements.

4. Not all identity data in a central database server will be distributed to all remote database servers due to strict security requirements. Only an applicable identity data set will be distributed to applicable remote database servers. There is not an off the shelf solution to replicate a customized data set.

5. Identity data which are modified in the central database server must be synchronized to all applicable remote distributed database servers. This would be difficult to do without a robust solution to synchronize data from the central database to each remote database server.

U.S. patent application Ser. No. 11/947,902 entitled "System and Method for Dynamic and On-Demand Data Transfer and Synchronization between Isolated Networks" describes a system to synchronize identity data. The synchronization method of the '902 patent application, however, uses human interaction; the synchronized data is downloaded to a file and then uploaded to the database. The synchronization method of the '902 application is further designed for isolated networks.

SUMMARY

The system disclosed solves problems for a system which requires synchronization of large data over a WAN and unstable network. It also solves synchronizing a subset of the data within a table to only applicable remote distributed database servers. The system enables PKI provisioning for Set Top Boxes being produced in a factory, as well as other electronic components being produced in a factory.

This disclosed system provides a solution to resolve the synchronization of identity data from a central database server to distributed database servers. The solution includes a method to synchronize identity data to the central database server and distributed servers based on identity type assignments allocated to a factory. This solution can be applied to any system separate from a single factory which has similar challenges with replication over a WAN including network instability, strict security requirements, and syncing selective identity data.

The following steps provide the example showing how a system according to the present invention is provided with identity data.

1. For the first step, the configuration manager assigns different identity data types to the factories which may manufacture the devices which will need Identity Data (ID). Each identity data is associated with a device and will be required to be loaded during the manufacturing time. Since it is not known which factory will have the device, the identity data must be synced to the factories where the device is built.

2. In a second step, the ID Loader receives a file containing new identity data and loads it to the central database server.

3. In a third step, once the records are loaded to the central database server, a record of the file information is created and stored in a file history table.

4. In a fourth step, once the file is loaded and the file history table is updated, an identity data loaded event triggers a Factory Synchronizer and Loader (FSL) to process the event. The FSL is triggered to create jobs based on the event table. Once the FSL is triggered to create a job, the steps a)-d) that the FSL follows are described as follows:

a) the FSL determines the records associated with a File ID from the Identity Data table.

b) the FSL determines the identity data type(s) associated with records from 4a.

c) the FSL determines the factory locations associated with data type.

d) Based on information from items a)-c), the FSL creates two "LOAD DATA" jobs, and sets the event status to COMPLETED.

5. In a fifth step, the FSL will execute each "Pending" job and load the identity data to one of the primary remote database servers in a factory. If a job fails, the FSL will continue on to the next job and retry later. Once a job is completed, the job status will be updated to COMPLETED in the Job Detail Table of FIG. 6 so that FSL will not execute the same job twice.

6. In a sixth step, the identity data is synchronized in the central data base with the remote database server in a location of one of the factories. Local database synchronization can be used in a factory location because the network within a LAN is much more stable than a WAN. There could be up to M number of database servers in a single factory location which will be kept in sync with the primary database server.

Different jobs can be triggered by the above steps. In one example, instead of identity data, configuration data can be maintained and synchronized with a central database that is running in remote servers.

Further, identity data can be incorrect due to numerous reasons that require modification. Once any incorrect identity data is distributed to all remote database servers, it must be corrected everywhere. The correction will happen in central database server, and the changes will be synchronized to all remote distributed database servers using the process described above as implemented by the FSL.

Further situations can require application of the above steps. For example, a new configuration manager can be added to a factory, and will need identity data loaded that is associated with the factory and synchronized with all remote servers. Further, the FSL can occasionally fail to synchronize the data from central to the remote database servers, and the FSL will need to reload and synchronize the identity data to recover.

BRIEF DESCRIPTION OF THE DRAWINGS

Further details of the present invention are explained with the help of the attached drawings in which:

FIG. 1 shows a Configuration Table used for a system of a first example embodiment of the present invention that provide an example association between factories and identity data types that are assigned by a configuration manager;

FIG. 2 shows an Identity Data Table used in the first example embodiment of the present invention;

FIG. 3 shows a File History Table used in the first example embodiment of the present invention;

FIG. 4 shows an Event Table used in the first example embodiment of the present invention;

FIG. 5 shows a Job Table used in the first example embodiment of the present invention;

FIG. 6 shows a Job Detail Table use in the first example embodiment of the present invention;

FIGS. 7-11 show tables of data used in accomplishing configuration data synchronization according to an example embodiment of the present invention;

FIGS. 12-16 show tables of data used in synchronization of changed identity data according to embodiments of the present invention;

FIGS. 17-21 show tables of data used in accomplishing addition of a new remote database server according to embodiments of the present invention;

FIGS. 22-23 show tables of data used for accomplishing synchronization after a failure occurs according to embodiments of the present invention;

DETAILED DESCRIPTION

Figures 24, 25:
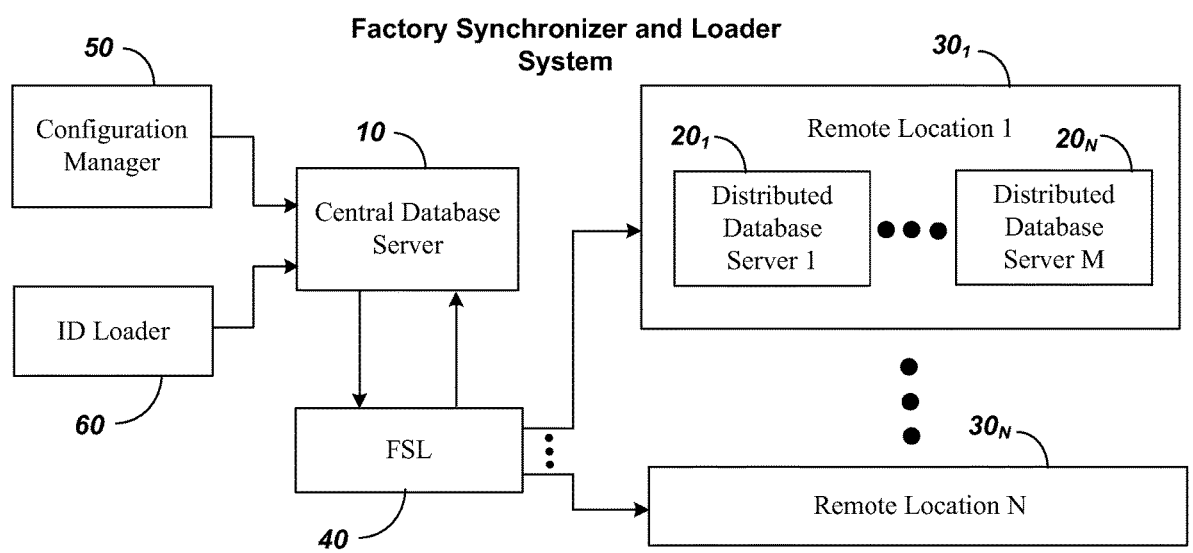
FIG. 24 shows a table indicating that multiple FSLs can be used according to embodiments of the present invention.
FIG. 25 shows a block diagram of a system of components used in embodiments of the present invention.

The following acronyms and terms will be used in a description of the disclosed system.
1. Configuration Manager: An application which configures and associates identify data types to remote locations.
2. Factory Synchronizer and Loader (FSL): An application that creates identity data loading jobs for each factory which is assigned the identity data type by the configuration manager.
3. Identity Data: Composed of device keys and digital certificates encrypted with unique keys which are associated with a device ID.
4. ID Loader: Application which loads the identity data to a central database.
5. LAN: Local Area Network.
6. WAN: Wide Area Network.

The following examples illustrate how systems according to the present invention deal with handling data and synchronization of the data between a central server and remote data servers.

A. Loading and Synchronizing ID Data

A first example shows how a system for loading and synchronizing identity data. The steps are illustrated with tables shown in FIGS. 1-6 for accomplishing loading the identity data. Steps for the first example are as follows:

1. For the first step, the configuration manager assigns different identity data types to the factories which may manufacture the devices which will need identity data. Each identity data is associated with a device and will be required to be loaded during the manufacturing time. Since it is not known which factory will have the device, the identity data must be synced to the factories where the device is built. The table of FIG. 1 shows an example association between the factories and identity data types which are assigned by the configuration manager.

2. In a second step, the ID Loader receives a file containing new identity data and loads it to the central database server. The table of FIG. 2 shows an example identity data table which the ID Loader loads to the central database server. In the case shown in FIG. 2, Comcast XRE and JCOM records are shown to be loaded to the central database server.

3. In a third step, once the records are loaded to the central database server, a record of the file information is created and stored in a file history table. FIG. 3 shows an example file history table. All identity data can always be traced to the file in the file history table.

4. In a fourth step, once the file is loaded and the file history table is updated, an identity data loaded event triggers the FSL to process the event. FIG. 4 shows an event table with an example list of completed and pending events processed by the FSL. The FSL is triggered to create jobs based on the event table, such as shown in FIG. 4. In this instance the pending event "Identity Data Loaded" shown in FIG. 4, triggers the FSL to create LOAD DATA job(s) for file ID 2, as shown in the Jobs Table of FIG. 5. The Jobs Table of FIG. 5 displays the completed and pending jobs which are processed by the FSL. Once the FSL is triggered to create a job, the steps a)-d) that the FSL follows are described as follows:

a) the FSL determines the records associated with File ID 2 (Table: File History and Record ID: 2) from the Identity Data table of FIG. 2.

b) the FSL determines the identity data type(s) associated with records from 4a, which is identity data type JCOM (65538).

c) the FSL determines the factory locations associated with data type 65538 from the Configuration Table of FIG. 1, which is two Foxconn locations—Tianjin (1000) and Taiwan (3000).

d) Based on information from items a)-c), FSL creates two "LOAD DATA" jobs, and sets event status to COMPLETED as shown in the Jobs Table of FIG. 5.

The details of which table(s) and record(s) needed to be synched for a job are found in the Job Details table of FIG. 6. The example Jobs Details table of FIG. 6 shows the JCOM records loaded to the central database in step 2 is waiting to be loaded to two Foxconn locations—Tianjin (1000) and Taiwan (3000).

5. In a fifth step, the FSL will execute each "Pending" job as shown in the Job Detail Table of FIG. 6 and load the identity data to one of the primary remote database servers in a factory. If a job fails, the FSL will continue on to the next job and retry later. Once a job is completed, the job status will be updated to COMPLETED in the Job Detail Table of FIG. 6 so that FSL will not execute the same job twice.

6. In a sixth step, a local database synchronization can be used in a factory location because the network within a LAN is much more stable than a WAN. There could be up to M number of database servers in a single factory location which will be kept in sync with the primary database server.

B. Additional User Cases

In steps 3-4 of the above example case, the "LOAD_DATA" job of FIG. 5 describes the event which triggers the logic (4a-4d) used to create the job details to synchronize the records for the "Identity Data" table of FIG. 2 to the assigned factory locations. Different jobs can be created and triggered by certain events to synchronize tables associated with a job. However, the same job details table of FIG. 6 and mechanism described in steps 5 and 6 can be applied to all jobs. The following are additional example cases which are triggered by certain events.

1. Configuration Data Synchronization

A second example shows how an embodiment of the present invention can be used to synchronize configuration data. The steps are illustrated with tables shown in FIGS. 7-11 for accomplishing configuration data synchronization as indicated by the "Configuration Data Synchronization" label above FIG. 7.

Besides identity data, there are also configuration data which are required by applications running in remote servers (i.e., an application which consumes identity data). These configuration data in a central database server must also be synchronized with all remote distributed database servers. In order to achieve this goal, FSL a system for synchronization according to the present invention should be able to handle different type of events and jobs.

Steps for this second example of configuration data synchronization are as follows: First, the Configuration Manager adds a new identity data type Secure Media (65539) to the Identity Data Type Table of FIG. 7 in the central database. Next, the Configuration Manager assigns type Secure Media (65539) to Foxconn Tianjin and Foxconn Taiwan to the Configuration Table of FIG. 8 in the central database. This triggers the CONFIG_DATA_CHANGED event step in the Event Table of FIG. 9. In this event, the FSL knows that the Record ID in this case is the Identity Data Type. In a further step, the FSL processes the CONFIG_DATA_CHANGED event and reads the Identity Data Type table with the Identity Data Type ID 65539. Next the FSL creates jobs 5 and 6 to respectively sync the Identity Data Type for 65539 configuration value for remote locations Foxconn—Tianjin (1000) and Foxconn—Taiwan (3000) as shown in Jobs Table 10. Finally, the FSL processes jobs 5 and 6 and respectively syncs locations 1000 and 3000 with the table Identity Data Type record for type 65539 as shown in the Job Details Table of FIG. 11.

Thus, in this example embodiment, when there is any modification in configuration data, the CONFIG_DATA_CHANGED event is created. The FSL will then intelligently process all CONFIG_DATA_CHANGED events and create SYNC_COFIG_DATA jobs. The FSL will process the job and synchronizes configuration data change set with all remote distributed database servers.

2. Identity Data Changed Synchronization

Identity data could be incorrect due to numerous reasons, and it requires modifications. Once any incorrect identity data is distributed to all remote database servers, it must be corrected everywhere. The correction will happen in central database server, and the changes will be synchronized to all remote distributed database servers.

A third example shows how an embodiment of the present invention can be used to synchronize changed identity data. The steps are illustrated with tables shown in FIGS. 12-16 for accomplishing synchronization of changed identity data as indicated by the "Identity Data Change and Synchronization Tables" label above FIG. 12.

In a first step, the ID Loader loads file Comcast_XRE_Fix.bin with one replacement record for Identity Data Type Comcast XRE (65537) for Device ID 0x000000000000 as shown in the Identity Data Table of FIG. 12. Since a previous record with same Identity Data Type and Device ID was already loaded, previous record is then disabled. The Identity Data ID 8193 is now the active record for Device ID 0x000000000000 in the central database. This triggers the ID_DATA_CHANAGED event step of the Event Table of FIG. 14. In this event, the FSL knows the Record ID in this case is the Identity Data ID. Next, the FSL processes the ID_DATA_CHANAGED event and reads central DB's Identity Data table Identity Data ID 8193. The FSL also reads the disabled records with the same Device ID, which in this case is Identity Data ID 1. Next, the FSL creates jobs 7 and 8 as shown in the Jobs Table of FIG. 15 to respectively sync the table Identity Data records 8193 and 1 to Foxconn—Tianjin (1000) and Cinram—Texas (2000). Finally, the FSL processes jobs 7 and 8 and respectively syncs Identity Data records to locations 1000 and 2000 as indicated in FIG. 16.

In sum, where there is any modification in the identity data, an ID_DATA_CHANGED event is created. Then, the FSL will process all ID_DATA_CHANGED events and create SYNC_ID_DATA jobs. The FSL will then process the job and synchronizes identity data changes with all remote distributed database servers.

3. New Remote Database Server

Using the Configuration Manager, a new factory is created and associated to an existing identity data type. A new event "New Factory" will trigger "LOAD DATA" jobs for each identity type associated with the new factory. A new remote database server being added will also trigger jobs.

A fourth example shows how an embodiment of the present invention can be used when a new remote database server is brought online. The steps are illustrated with tables shown in FIGS. 17-21 for accomplishing addition of a new remote database server as indicated by the "New Rote Database Server Update Tables" label above FIG. 17.

In a first step, the Configuration Manager adds a new Factory location Flextronics—Taiwan (4000) as shown in Factory table of FIG. 17. Next, the Configuration Manager assigns Comcast XRE data type (65537) to new Flextronics—Taiwan Location (4000) as shown in Configuration Table of FIG. 18. This triggers the NEW_FACTORY event. In this event, the FSL knows to read central DB's configuration table where factory ID 4000 and associated Identity Data Types, as shown in the event table of FIG. 19. The FSL creates a job 9 to load all the Comcast XRE (65537) identity records to Flextronics—Taiwan (4000), as shown in the Job Table of FIG. 20. Finally, the FSL processes job 9 and syncs the data records (8193 and 1-4096) to location 4000 as shown in FIG. 21.

4. Completion of Synchronization

FSL will occasionally fail to synchronize the data from central to remote database servers due to the remote distributed database servers are extremely busy, unstable network connections or unforeseen errors. With embodiments of the present invention, the FSL can recover by itself with the minimum human interaction. For instance, FSL will intelligently try to reschedule itself to process the failed jobs in different intervals. FSL will also process the jobs according to their priorities.

A fifth example shows how an embodiment of the present invention can be used to accomplish synchronization after synchronization fails. The steps are illustrated with tables shown in FIGS. 22-23 for accomplishing synchronization after a failure occurs as indicated by the "Tables Showing Completion after Failure of Synchronization" label above FIG. 22.

In the process for this fifth example, during the execution of job 9 the network connection between FSL and location 4000 was dropped and job 9 failed to execute at record ID 3608 as indicated in the Job Table of FIG. 22. The FSL will then attempt to complete job 9 at the next configured run time. The FSL syncs Identity Data records 3608-4096 to location 4000 as shown in the Job Details Table of FIG. 23.

5. Multiple FSL Case

With the large identity data records to sync from a single central database to many locations, the syncing of data to site with bad connection may cause a bottleneck issues. Running multiple instance of the FSL will allow parallel synchronization to multiple sites.

A sixth example shows how an embodiment of the present invention can be used with multiple FSLs. The steps are illustrated with the Job Table of FIG. 24 as indicated by the label above the FIG. 24 "Multiple FSL Case."

In a first step, shown in the table of FIG. 24, an FSL #1 completes job 10 of loading data to factory. Next, the FSL #1 begins job 11 of loading data to a factory. Next, the FSL #2 starts up. The FSL #2 looks at the central database job table and reads the next PENDING job 12. The FSL #2 changes the status of job 12 to PENDING and begins loading data to a factory at same time FSL #1 is loading data.

FIG. 25 illustrates a connection of components used in embodiments of the present invention. As shown the system includes a central database server 10 along with remote database servers $20_1$-$20_M$ located in a remote factory location $30_1$. Other remote database servers similar to $20_1$-$20_M$ of remote factory location $30_1$ are located in other remote locations such as location $30_N$. The central database server 10 is connected to both receive and transmit data to the FSL 40. The configuration manager 50 provides data and control signals to the central database server 10, and the ID loader 60 similarly provides data to the central database server. The FSL provides for communication to the remote database servers located in remote locations as well as $30_1$-$30_N$, and the FSL enables synchronization of data in the remote database servers of the individual remote locations with data in the central database server 10.

Each of the servers of the system of FIG. 25 can include one or more processors and memory devices store data and provide software to control the processors. The memory can include the configuration data, identity data and other data stored in the tables described herein. The software to control the processors can include the software to cause the FSL, central database server and remote database servers to perform the functions according to embodiment of the present invention described herein.

Although the present invention has been described above with particularity, this was merely to teach one of ordinary skill in the art how to make and use the invention. Many additional modifications will fall within the scope of the invention, as that scope is defined by the following claims.

What is claimed:

1. A method for resolving the synchronization of identity data from a central database server to distributed database servers comprising:
   assigning by a configuration manager identity data types to factories which manufacture devices that will need identity data for secure identification;
   receiving by an Identity Data (ID) Loader a file containing the identity data, the ID Loader loading the identity data to the central database server and creating in the central database server a file history record indicating a record of the file loaded, wherein the central database server is located at a data distribution center separate from factories where the remote distributed database servers are located and is more stable to maintain the identify data than the remote distributed database servers, wherein further access to the file containing the identity data outside the central database server to obtain identity data is no longer required;
   triggering a Factory Synchronizer Loader (FSL) to create at least one identity data loading job based on an event table, wherein the identity data loading job comprises:
      (a) determining the record associated with an ID of the file;
      (b) determining an identify data type associated with the record; and
      (c) determining a factory location associated with the data type from the configuration table;
      (d) based on the information from (a)-(c) creating the load data job;
   executing by the FSL the pending load data job by loading the identity data only to a selected one of a plurality of primary remote ones of the distributed database servers located in one of the factories so that the selected remote one of the distributed database servers has identity data different than remaining ones of the plurality of primary remote ones of the distributed database servers; and
   synchronizing the identity data in the central data base server individually with the selected remote one of the distributed database servers in the location of one of the factories.

2. The method of claim 1, further comprising synchronizing configuration data in the central database server with the remote database server.

3. The method of claim 1, further comprising:
   identifying that the identity data provided to the selected remote database server is incorrect;
   correcting the incorrect identify data in the central database server; and
   synchronizing changes in the corrected identity data individually with the selected remote database server.

4. The method of claim 1, further comprising synching the identity data of a device to a factory where the device is built.

5. The method of claim 1, wherein in the step of executing by the FSL the pending load data job, if the jobs fails, the FSL will continue on to a next job and retry the failed job later.

6. The method of claim 1, wherein in the step of executing by the FSL the pending load data job, once the FSL executes the load data job, updating a job status to completed.

* * * * *